Dec. 6, 1955  A. T. ANDRESKI  2,725,990
SWINGING BOOM SIDE LOADER
Filed Jan. 2, 1953
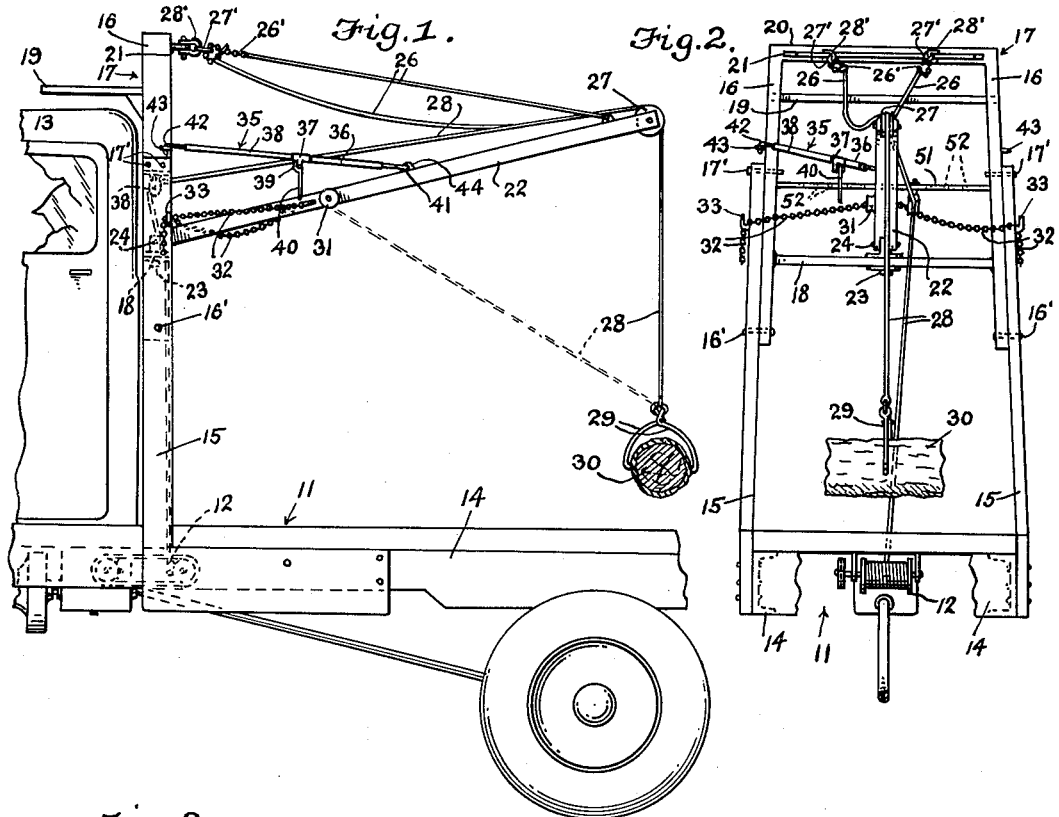
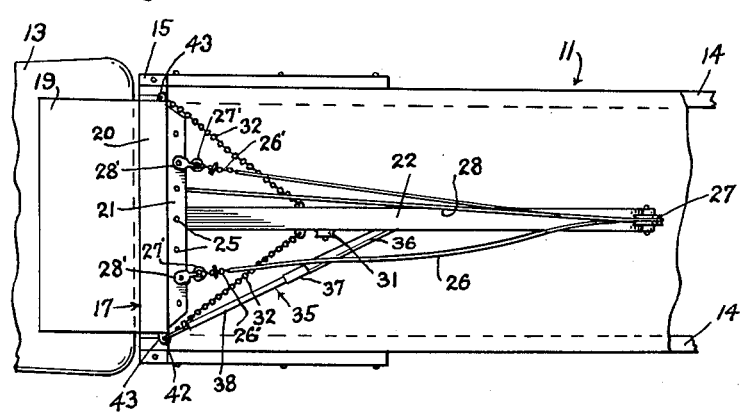
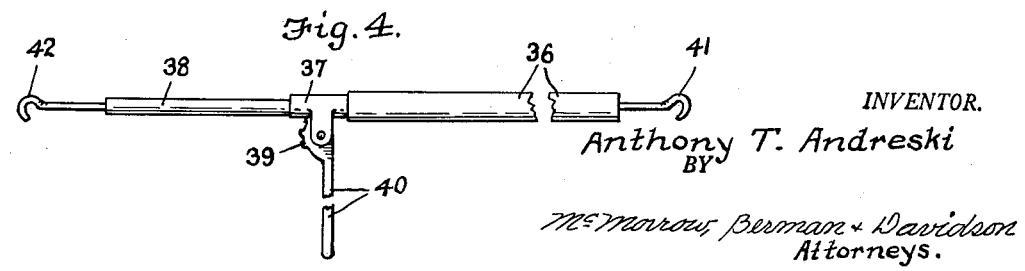
INVENTOR.
Anthony T. Andreski
BY
McMorrow, Berman & Davidson
Attorneys.

United States Patent Office 2,725,990
Patented Dec. 6, 1955

2,725,990

SWINGING BOOM SIDE LOADER

Anthony T. Andreski, Iron River, Mich.

Application January 2, 1953, Serial No. 329,358

3 Claims. (Cl. 212—53)

This invention relates to loading devices, and more particularly to an improved loading device of the boom type, suitable for use on trucks.

The main object of the invention is to provide a novel and improved loading device for trucks, said device being simple in construction, being easy to install, and being readily adjustable to allow a truck to be loaded from the side or rear thereof.

A further object of the invention is to provide an improved swingable boom loading device suitable for use on trucks, said device involving inexpensive components, being rugged in construction, being easy to adjust to a desired operating position, whereby material may be loaded on a truck from any side or from the rear thereof, and being safe to use.

Further objects and advantages of the invention will become apparent from the following description and claims, and from the accompanying drawings, wherein:

Figure 1 is a fragmentary side elevational view of a portion of the body of a truck, said body being equipped with an improved swingable boom loading device of the present invention.

Figure 2 is a rear end elevational view of the body of the truck of Figure 1.

Figure 3 is a top view of the structure shown in Figure 1.

Figure 4 is an enlarged side elevational view of the extensible locking rod employed for controlling the horizontal movement of the boom.

Referring to the drawings, 11 designates a conventional truck body provided with the winch reel 12, said reel being mechanically coupled to the truck motor for operation thereby. The cap of the truck is shown at 13. Secured to the longitudinal side members 14,14 of the truck body adjacent the cab 13 are the vertical, upstanding frame members 15,15 and secured to the upper portions of said frame members are the respective side elements 16,16 of a transversely extending frame 17. As shown, the lower ends of the side elements 16,16 are pivotally connected to the frame members 15,15 respectively at 16', 16'. The intermediate portions of the side elements 16, 16 are detachably secured to the top ends of the frame members 15,15 by removable bolts 17',17', whereby the frame 17 may be at times swung downwardly to a rearward non-obstructing position by removing the bolts 17'.

Rigidly connected between the intermediate portions of the side elements 16,16 is the transverse bar 51, said bar being formed with apertures 52 spaced regularly therealong.

Secured between the lower portions of the side elements 16,16 of frame 17 is the horizontal transverse bar member 18. The upper portions of the side members 16,16 are rigidly connected by a forwardly extending transverse horizontal platform 19 and by a top horizontal transverse bar member 20 to which is rigidly secured the transversely extending horizontal plate member 21.

Designated at 22 is the elongated boom member which is pivotally connected to the intermediate portion of the transverse bar element 18 for swinging movement vertically and horizontally. The pivotal connection of the boom member 22 to the intermediate portion of transverse bar 18 may be made in any suitable manner, for example, may comprise a short vertical member 23 swiveled to the intermediate portion of bar member 18, to the top end of which the boom member 22 is connected, as by the transverse pin connection 24, whereby the boom member may rotate around the axis of pin member 24 and also around the vertical axis of the swivel member 23.

The transverse plate member 21 is formed with the spaced apertures 25, and the rear end of the boom member 22 is connected to a pair of selected apertures 25 by means of suitable flexible cables 26,26, whereby the boom member may be supported in a desired angled position. Cables 26 are provided at their ends with chains 26' provided with fastening hooks. Said chains extend through links 27' which are connected to clevis members 28' releasably secured to the plate member 21 at selected apertures 25. The boom 22 is provided at its end with a main pulley 27 over which extends the winch cable 28, said winch cable being wound on the winch reel 12. Cable 28 extends over a pulley or block 38' supported on the bar 51 at a selected aperture 52 of said bar 51. The end of the cable 28 is provided with the grab hooks 29,29, as shown in Figure 1, for engaging the object to be elevated, as for example, the timber 30. A further pulley 31 is provided on the boom 22, the cable 28 being engageable over the pulley 31 when it is desired to move the object being elevated forwardly on the bed of the truck after the object has been elevated onto said bed.

Connected to the intermediate portion of the boom 22 at the opposite sides thereof are the respective securing chains 32,32 which may be lockingly engaged in hook-shaped brackets 33, 33 provided on the upper portions of the frame members 15,15 for restraining side swinging movement of the boom 22 after it has been elevated and secured in its operating position by the use of the cables 26,26. To further lock the boom against undesired side swinging, an adjustable tie rod 35 is employed, said tie rod comprising an outer sleeve 36, said outer sleeve having a reduced end portion 37 through which slidably extends a shank 38 which may be locked in adjusted position in the outer sleeve 36 by means of a serrated cam 39 pivoted to the reduced sleeve member 37 and engageable through a slot in said sleeve member with the shank 38, the cam being provided with a handle 40 for rotating the cam into locking engagement with the shank 38. The outer sleeve 36 is provided with a hook element 41 and the shank member 38 is provided with a similar hook element 42, the hooks 41 and 42 being engageable with respective apertured lugs 43 and 44 provided on the frame elements 16 and the boom 22, as shown in Figures 1 and 2, whereby the tie rod 35 serves as a positive anchoring means for restraining swinging movement of the boom in a horizontal direction.

As above explained, the boom 22 may be locked in an elevated and laterally swung position by means of one of the chains 32 and tie rod 35. Thus, assuming that loading is to be swung from the lower side of Figure 3, the procedure employed is as follows:

1. With the members arranged as in Figure 3, that is, with the boom 22 centered and with its outer end over the bed of the truck, the end of the upper cable 26 (as viewed in Figure 3) is connected by means of its clevis member 28' to an aperture 25 on plate member 20, selected so that the upper cable 26 is tight, as shown, the lower cable 26 being loose and serving as a safety cable.

2. The upper chain 32 of Figure 3 is unfastened and the boom 22 is manually swung laterally (downwardly, as viewed in Figure 3) to a position wherein the pulley 27 is substantially over the load to be raised. This lateral swinging causes the pulley 27 and the outer end of the boom to be elevated, because the tight cable 26 acts as a radius rod, and the elevation and lateral swinging of the boom thus develops a biasing force tending to return the boom to its centered position over the truck bed.

3. The tie rod 35 is adjusted to a length such that it can be connected between the lugs 43 and 44 in the laterally swung position of the boom. The tie rod is locked by its handle 40 and the cam 39 in this adjusted length and is then connected by its hooks 41 and 42 to the lugs 43 and 44, holding the boom in its laterally swung position.

4. The lower chain 32 may be employed to hold the boom in its laterally swung position while the tie rod 35 is being adjusted and is connected to the lugs 43 and 44. After the tie rod has been connected to lugs 43 and 44, the lower chain 32 may be reconnected so that its effective length is such as to limit the return swinging movement of the boom to the centered position of Figure 3.

5. The cable 28 is lowered and the grab hooks 29, 29 are engaged with the load.

6. The load is elevated by means of the winch reel 12, and when the load has been raised a substantial distance above the level of the truck body, the handle 40 is rotated to unlock the cam 39. Since the member 38 is telescopically slidable in the sleeve 36, the biasing force developed by the above described radius rod action of the tight upper cable 26, together with the additional biasing effect provided by the weight of the load causes the boom and load to swing back over the truck bed and causes the boom to return to its centered position of Figure 3, the return movement being limited by the lower chain 32, as above mentioned.

7. The load may then be lowered onto the truck by lowering the cable 28.

The tie rod 35 thus serves to keep the load clear of the truck body as the load is raised. When the load has been elevated above the level of the truck body the handle 40 is released to allow the load to swing over the truck body because of the tension exerted by the tight cable 26.

Loading may be accomplished regardless of the tilted position of the truck by merely making proper adjustments of the cables 26, by means of the clevis members 28' and the adjusting apertures 25. The block 38' may be also adjusted along the bar 51 by means of the adjusting apertures 52 in the event of extreme conditions wherein adjustment of the tight cable 26 will not provide the required gravitational force to properly swing the elevated load over the truck bed.

When loading from the rear end of the truck, it may be desired to move the load forwardly toward the forward end of the truck as it is being elevated. This may be accomplished by engaging the cable 28 around the auxiliary pulley 31, whereby operation of the winch will exert the necessary forwardly directed pull on the object to move said object to a forward position on the truck bed. Thus, the truck may be loaded either from the back end thereof or from the sides thereof.

While a specific embodiment of an improved adjustable swinging boom for use on motor trucks and the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a truck, a winch reel mounted on the truck, a boom pivoted to said truck for swinging movement vertically and horizontally, a pulley journaled on said boom, a cable extending over said pulley and connected to said reel, means connecting said boom to said truck at a point spaced laterally from the pivot point of the boom, a first rod member detachably connected to said boom, a second rod member connected to said truck at a point laterally spaced from the pivot axis of the boom, said rod members being telescopically received for movement one within the other, and means for locking said rod members against said movement to control horizontal movement of said boom after it has been rotated vertically to a desired elevated position relative to the truck.

2. In a truck, a winch reel mounted on the truck, a transversely extending vertical frame on the truck, a boom, means connecting said boom to said frame for swinging movement vertically and horizontally, a pulley journaled on said boom, a cable extending over said pulley and connected to said reel, means connecting said boom to said truck at a point spaced laterally from the pivot point of the boom and being arranged to act as a radius rod when the boom is swung laterally, a rod member detachably connected to said boom, a second rod member connected to said truck at a point laterally spaced from the pivot axis of the boom, said rod members being telescopically received for movement one within the other, and means for locking said rod members against said movement to control horizontal movement of said boom after it has been rotated vertically to a desired elevation relative to the truck.

3. In a truck, a winch reel mounted on the truck, a transversely extending, vertical frame rigidly secured to said truck above said reel, a first transverse bar member on the intermediate portion of said frame, a boom, means connecting said boom at one end to the intermediate portion of said bar member for swinging movement vertically and horizontally, a pulley journaled on said boom adjacent the other end, a cable extending freely over said pulley and connected to said reel, a second transverse bar member secured to said frame above the first bar member, respective flexible members connecting said other end of the boom to points on said second transverse bar member spaced laterally of the vertical pivotal axis of said boom and forming the sole support for said other end of the boom, said flexible members serving to elevate the boom when said boom is swung horizontally, and an extensible telescopic rod member detachably connected to said boom and said truck to control horizontal movement of said boom after it has been rotated to a desired position relative to the truck, said rod member including means for locking the rod member in a desired extended condition.

References Cited in the file of this patent

UNITED STATES PATENTS

| | | |
|---|---|---|
| 412,525 | McBride et al. | Oct. 8, 1889 |
| 746,168 | Rood et al. | Dec. 8, 1903 |
| 1,874,189 | Howard | Aug. 30, 1932 |
| 2,519,119 | Dalbeck | Aug. 15, 1950 |